United States Patent Office 3,401,190
Patented Sept. 10, 1968

3,401,190
3-(ISOCYANATOMETHYL)-3,5,5-TRI-LOWER-ALKYL CYCLOHEXYL ISOCYANATES
Karl Schmitt, Herne, Fritz Gude, Wanne-Eickel, Klaus Rindtorff, Jr., Recklinghausen, and Josef Disteldorf, Wanne-Eickel, Germany, assignors to Scholven-Chemie Aktiengesellschaft Gelsenkirchen-Buer, Germany, a corporation of Germany
No Drawing. Filed July 15, 1965, Ser. No. 472,336
Claims priority, application Germany, July 21, 1964, Sch 35,500
2 Claims. (Cl. 260—453)

ABSTRACT OF THE DISCLOSURE

3 - (isocyanatomethyl)-3,5,5-tri-lower-alkyl cyclohexyl isocyanates and a method of preparing the same, comprising reacting 3 - (aminomethyl)-3,5,5-tri-lower-alkyl cyclohexylamine and phosgene.

---

This invention is related to the production of diisocyanates. It more particularly relates to a novel class of diisocyanates. Diisocyanates are a known useful class of compounds. They are reactive with active hydrogen-containing compounds such as polyhydroxy compounds to produce polyurethanes and polyamido compounds to produce polyureas. Both the latter classes of compounds have known utility. In addition, diisocyanates are also reactive with amines, mercaptans, urethanes, ureas, and other similar compounds to produce linear high-molecular resinous materials where both reactants are poly-functional. Cross-linked products can be produced where there are at least three functional groups in at least one of the reactive molecules.

It is an object of this invention to provide a novel group of diisocyanates.

It is a further object of this invention to provide a method of producing this novel group of diisocyanates.

It is a still further object of this invention to produce a novel series of condensation polymers which constitute the reaction products of the novel group of diisocyanates and various poly-functional active hydrogen-containing compounds.

In accord with the principal object of this invention, a novel group of compounds is provided: 3-(isocyanatomethyl)-3,5,5-tri-lower-alkyl cyclohexyl isocyanate. In accordance with this invention the lower alkyl substituents can be the same or different and may preferably be methyl, butyl or hexyl. Most preferred is the embodiment where the 3,5,5-substituents are all the same and where they are all methyl.

The diisocyanates of this invention can be prepared by the reaction of the corresponding diamine as, for instance, 3-(aminomethyl) - 3,5,5 - trimethylcyclohexyl amine with hydrogen chloride or carbon dioxide to form the usual adduct followed by the reaction of the thus formed adduct with phosgene to produce the diisocyanate. The products thereby obtained are distinguished by their excellent applicability for cross-linking reactions of albuminous substances (tanning agents), and further for example by their superior adhesive properties in the bonding of metals with high-molecular synthetic or natural substances, as, for example, the bonding of metals to various types of rubbers. They also may be reacted for example with diols or polyols to form polyurethanes, or with di- or poly-amides to form polyureas. In addition, there can be reacted with amines, mercaptans, urethanes and/or ureas to provide equally useful products.

It is desirable to carry out the isocyanate producing reaction and even the adducting reaction in the presence of a substantially inert solvent. Such solvent should not have a boiling point close to either that of the amine reactant or the isocyanate product, nor should it form an azeotrope with either since this would unduly complicate product purification procedures. Particularly useful solvents include the substituted benzenes as, for instance, chloro, nitro or alkyl—i.e., methyl benzenes—preferably with more than one substituent group as, for instance, xylene. Further, the class of hydrogenated aromatic hydrocarbons represents advantageous solvents. Of particular interest for the purposes of the instant invention is decahydronaphthalene since, by the use thereof, very high reaction yields have been obtained. This reaction can be carried out in the liquid or gas phases at temperatures ranging from 10 to 350° C. In the liquid phase, temperatures of about 10 to 250° C. are preferred. In the gas phase, temperatures of about 100 to 350° C. are preferred.

Where the reaction solvent does not dissolve the adduct as well as the reactant, it is desirable to provide intense stirring so as to intimately mix the adduct with the phosgene reactant. Where the reaction is carried out in the gas phase, it is preferred to directly react the phosgene and the amine, in which case it is preferred to atomize the amine-(1) were dissolved in 3 l. o-dichlorobenzene. Dry phosgenation is also possible in the liquid phase reaction.

It is always desirable to carry out the reaction in a system substantially free of water, phenols, alcohols or amines, in order to avoid side reactions and consequent yield reduction.

The invention is described in greater detail in the following illustrative examples without, however, intending thereby in any way to restrict the scope thereof.

Example 1

350 g. 3 - (aminomethyl) - 3,5,5 - trimethylcyclohexyl-amine-(1) were dissolved in 3 l. o-dichlorobenzene. Dry hydrogen chloride was introduced into this solution while stirring vigorously. The temperature of the suspension which was thereby formed increased from 20° C. to 100° C. After 2 hours, the reaction had become noticeably more viscous, and the temperature fell again slowly.

Phosgenation: $COCl_2$ dried at 160° C. was introduced into this hot solution. After 28 hours, the hydrochloride was converted. A homogeneous light-brown liquid was formed. Traces of $COCl_2$ and HCl which were present were removed by blowing dried nitrogen through the liquid product.

Distillation: The main amount of the solvent was separated under vacuum at 65 to 70° C. The first runnings contained only small amounts of isocyanate. The remaining isocyanate solution was fractionated using a short column. A waterclear fraction passed over at 126 to 128° C. and 2 mm. Hg.

Yield: 323 g.=70.7%
Isocyanate number: theoretical
Chlorine value: ~0.1%
Phosgene throughput: 1.32 kg.

Example 2

340 g. (2 mols) 3-(aminomethyl)-3,5,5-trimethylcyclohexylamine-(1) were dissolved in 3 l. decahydronaphthalene and the resulting solution heated to 90 to 95° C. At this temperature, a vigorous stream of HCl was introduced while stirring intensively. As soon as the hydrochloride suspension absorbed no further hydrogen chloride, the introduction of HCl was stopped.

The reaction mixture was then heated to 150° C. and treated with phosgene gas while stirring vigorously. The total hydrochloride was converted after 10 to 12 hours. The end of the reaction was noticeable by the formation of a clear, light-brown solution from the milky suspension. Excess hydrochloric acid and phosgene were subsequently removed by blowing dry nitrogen through the solution.

The reaction mixture was distilled by fractionation through a 50 cm. packed column. After the first runnings of the solvent had passed over, 405 g. of the diisocyanate were obtained.

B.P. 15: 158 to 159° C.
$n_D{}^{25}$ 1.4820
Yield: 91.2% of the theoretical
Phosgene throughput: 20 mols Example 3

340 g. (2 mols) 3-(aminomethyl)-3,5,5-trimethylcyclohexylamine-(1) were dissolved in 3 l. chlorobenzene and heated to 90 to 95° C. $CO_2$ was then introduced while stirring intensively as long as the formed reaction mixture absorbed no further carbonic acid.

The reaction mixture was then heated to 150° C. and treated with phosgene while stirring intensively. The reaction was ended after 15 hours. The end of the reaction was noticeable by the formation of a clear light-brown solution from the milky suspension. Gas excesses were removed by blowing dry nitrogen.

The reaction mixture was distilled by fractionation through a 50 cm.-packed column. After the first runnings the solvent had passed over, 371 g. of the diisocyanate were obtained.

B.P. 15: 158 to 159° C.
$n_D{}^{25}$ 1.4820
Yield: 83.5% of the theoretical
Phosgene throughout: 30 mols.

The diamine reactant can be prepared by the reaction of hydrocyanic acid and isophorone followed by hydrogenation of the resultant dinitrile to the corresponding diamine. This reaction has been described in the U.S. Patent application Ser. No. 228,514, issued to U.S. Pat. No. 3,270,044 and c.i.p. application Ser. No. 382,922 issued to U.S. Pat. No. 3,352,913.

We claim:

1. 3-(isocyanatomethyl)-3,5,5-tri-lower-alkyl cyclohexyl isocyanate, wherein all of said lower alkyl groups are the same.

2. The diisocyanate claimed in claim 1 wherein each of said lower-alkyl groups is methyl.

References Cited

UNITED STATES PATENTS

| | | | |
|---|---|---|---|
| 2,728,787 | 12/1955 | Hurwitz et al. | 260—453 |
| 2,911,429 | 11/1959 | Bloom et al. | 260—453 |
| 3,270,044 | 8/1966 | Schmitt et al. | 260—464 |

CHARLES B. PARKER, *Primary Examiner.*

D. H. TORRENCE, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,401,190                       September 10, 1968

Karl Schmitt et al.

It is certified that error appears in the above identified patent and that said Letters Patent are hereby corrected as shown below:

In the heading to the printed specification, line 7, after "Aktiengesellschaft" insert a comma. Column 1, line 26, before "polyamido" insert -- with --. Column 2, line 23, "amine-(1) were dissolved in 3 l. o-dichlorobenzene. Dry" should read -- as it is being introduced into the reactor. Direct --.

Signed and sealed this 10th day of February 1970.

(SEAL)
Attest:

Edward M. Fletcher, Jr.                     WILLIAM E. SCHUYLER, JR.

Attesting Officer                            Commissioner of Patents